US011552888B2

(12) United States Patent
Hama et al.

(10) Patent No.: US 11,552,888 B2
(45) Date of Patent: Jan. 10, 2023

(54) COMMUNICATION APPARATUS AND COMMUNICATION METHOD (71) Applicant: FUJITSU LIMITED, Kawasaki (JP)

(72) Inventors: Norihito Hama, Kawasaki (JP); Akihiro Hata, Kawasaki (JP); Toshihiro Ban, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/202,396

(22) Filed: Mar. 16, 2021

(65) Prior Publication Data
US 2021/0385158 A1 Dec. 9, 2021

(30) Foreign Application Priority Data

Jun. 9, 2020 (JP) .............................. JP2020-100138

(51) Int. Cl.
*H04L 45/00* (2022.01)
*H04L 45/74* (2022.01)
*H04L 45/42* (2022.01)

(52) U.S. Cl.
CPC ............ *H04L 45/566* (2013.01); *H04L 45/32* (2013.01); *H04L 45/42* (2013.01); *H04L 45/74* (2013.01)

(58) Field of Classification Search
CPC . H04L 12/4641; H04L 45/74; H04L 61/2592; H04L 65/1069; H04L 45/02; H04L 45/04; H04L 45/54; H04L 12/4633; H04L 61/103; H04L 63/0236; H04L 29/06; H04L 47/12; H04L 49/354; H04L 12/18; H04L 12/4625; H04L 45/00; H04L 69/16; H04L 41/0803; H04L 47/125; H04L 61/256; H04L 49/351; H04L 49/70; H04L 49/90; H04L 61/2514; H04L 45/38; H04L 49/25; H04L 63/08; H04L 29/06027;
(Continued)

(56) References Cited

U.S. PATENT DOCUMENTS

2004/0066781 A1* 4/2004 Shankar .............. H04L 47/2433
370/389
2004/0225725 A1 11/2004 Enomoto et al.
(Continued)

FOREIGN PATENT DOCUMENTS

JP 2014-158113 A 8/2014
WO 2004/075482 A1 9/2004
WO WO 2005/109718 * 11/2005 .............. H04L 1/00

*Primary Examiner* — Djenane M Bayard
(74) *Attorney, Agent, or Firm* — Fujitsu Patent Center (57) ABSTRACT

A communication device includes a processor. The processor updates, when a port which is received a packet is connected to a first path or a second path, an identifier assigned to the packet from a value according to the path to a first value or a second value. The processor learns a correspondence relationship between a destination address of the packet and a transmission port by flooding the packet, and determines the transmission port based on the correspondence relationship. The processor updates, when the transmission port is connected to the first path or the second path, the identifier assigned to the packet of which the transmission port is determined to a value according to the first path or the second path. The processor discards the packet of which the identifier is updated to the second value by the first process and the transmission port is connected to the second path.

4 Claims, 8 Drawing Sheets

(58) Field of Classification Search
CPC ........... H04L 29/12066; H04L 29/1216; H04L 29/12367; H04L 29/12377; H04L 29/12424; H04L 45/42; H04L 45/08; H04L 12/437; H04L 12/4645; H04L 41/0806; H04L 41/0895; H04L 41/122; H04L 49/606; H04L 67/56; H04L 45/308; H04L 45/64; H04L 45/745; H04L 12/40013; H04L 12/4013; H04L 12/40169; H04L 12/42

See application file for complete search history.

(56) References Cited

U.S. PATENT DOCUMENTS

2011/0282926 A1\* 11/2011 Amemiya ............... H04L 12/66
709/201
2017/0041223 A1\* 2/2017 Akashi ................ H04L 61/6009

\* cited by examiner

| IG SIDE | | | EG SIDE | | |
|---|---|---|---|---|---|
| INTERFACE ATTRIBUTE | INPUT VID | UPDATED VID | INTERFACE ATTRIBUTE | UPDATED VID | OUTPUT VID |
| ROOT | 10 | 30 (K1) | ROOT | 10 | 10 |
| | | | LEAF | 20 (Ka) | 20 |
| | | | NNI | 30 | 30 |
| LEAF | 20 | 40 (K2) | ROOT | 10 | 10 |
| | | | LEAF | 20 (Kb) | - |
| | | | NNI | 40 | 40 |
| NNI | 30 | 30 (K3) | ROOT | 10 | 10 |
| | | | LEAF | 20 (Kc) | 20 |
| | | | NNI | 30 | 30 |
| | 40 | 40 | ROOT | 10 | 10 |
| | | | LEAF | 20 (Kd) | - |
| | | | NNI | 40 | 40 |

COMMUNICATION APPARATUS AND COMMUNICATION METHOD

CROSS-REFERENCE TO RELATED APPLICATION

This application is based upon and claims the benefit of priority of the prior Japanese Patent Application No. 2020-100138, filed on Jun. 9, 2020, the entire contents of which are incorporated herein by reference.

FIELD

This case discussed herein is related to a communication apparatus and a communication method.

BACKGROUND

An E-TREE is a network in which an Internet Service Provider (ISP) provides an Internet connection service to a user (for example, refer to Japanese Laid-open Patent Publication No. 2014-158113). The E-TREE includes, for example, a plurality of layer 2 switches and relays communication between a terminal device of a client and a gateway device to the Internet. The E-TREE is stipulated in Metro Ethernet Forum (MEF) 6.2 and International Telecommunication Union Telecommunication Standardization Sector (ITU-T) standard G.Sup52.

In each layer 2 switch, a plurality of ports that transmits and receives packets is provided. An attribute of an interface between the ports of the layer 2 switches is referred to as a "Network Interface (NNI)", an attribute of an interface between the gateway device and the port is referred to as "root", and an attribute of an interface between the terminal device and the port is referred to as "leaf". Each layer 2 switch updates a Virtual Local Area Network (VLAN) assigned to an egress-side packet to a VLAN Identifier (VID) according to the attribute of the interface of the transmission port.

In the E-TREE, communication between users is prohibited while communication from the user to the gateway device is allowed. Therefore, although communication from the gateway device (root) to the other gateway device and the terminal device (leaf) and communication from the terminal device to the gateway device are allowed, communication between the terminal devices is prohibited. Therefore, the layer 2 switch needs to transfer packets through an asymmetric path.

In the layer 2 switch in the E-TREE, functions of flooding and MAC address learning are divided into two domains in order to achieve Media Access Control (MAC) address learning of the asymmetric path. One domain performs flooding and MAC address learning on a packet through a path from the root to the leaf, and another domain performs flooding and MAC address learning on a packet through a path from the leaf to the root.

MAC address learning synchronization processing is executed between the two domains. For example, International Publication Pamphlet No. WO 2004/075482 discloses a point that the MAC address learning synchronization processing is executed by transferring a packet for MAC address learning of which VLAN tag information is edited in a direction opposite to a packet transmission direction.

In this way, it is possible for the layer 2 switch to prohibit the communication between the leaves by separating the domains for each communication direction.

Japanese Laid-open Patent Publication No. 2014-158113 and International Publication Pamphlet No. WO 2004/075482 are disclosed as related art.

SUMMARY

According to an aspect of the embodiments, a communication device in a relay network that relays packet between one or more gateway devices and a plurality of terminal devices, the communication device includes a plurality of ports configured to transmit and receive the packet; and a processor configured to: perform, when a port which is received packet included in the plurality of ports is connected to a first path of the one or more gateway devices or a second path of the plurality of terminal devices, a first process which updates an identifier assigned to the packet received by the plurality of ports from a value according to the first path or the second path to a first value or a second value, learn a correspondence relationship between a destination address of the packet and a transmission port that transmits the packet by flooding the packet to a port included in the plurality of ports other than a reception source port, determine the transmission port based on the correspondence relationship, perform, when the transmission port is connected to the first path or the second path, a second process which updates the identifier assigned to the packet of which the transmission port is determined from the first value or the second value to a value according to the first path or the second path, discard the packet of which the identifier is updated to the second value by the first process and the determined transmission port is connected to the second path.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related art, because the layer 2 switch uses the two domains, and in addition, executes complicated MAC address learning synchronization processing, the layer 2 switch needs more hardware. Therefore, reducing the number of paths that can be set for a single layer 2 switch than that in a case where only one domain is used reduces the number of users that can be accommodated in the E-TREE.

Therefore, an object of this case is to provide a communication device and a communication method that can reduce hardware used for MAC address learning of an asymmetric path in which communication between users is prohibited.

(Configuration Example of E-TREE)

Figure 1:
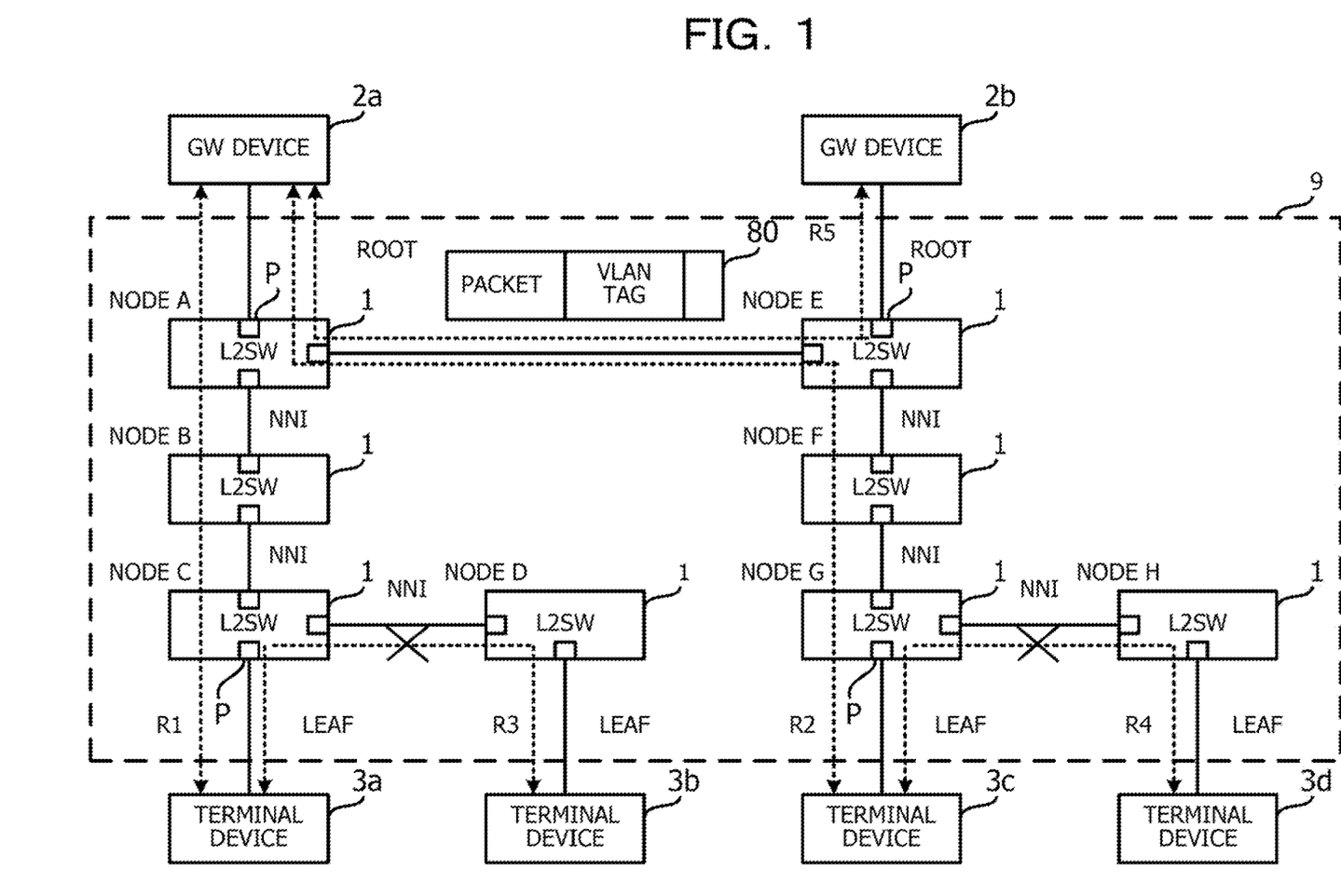
FIG. 1 is a configuration diagram illustrating an example of an E-TREE.

FIG. 1 is a configuration diagram illustrating an example of an E-TREE 9. The E-TREE 9 is an example of a relay network, and relays a packet 80 between one or more gateway (GW) devices 2a and 2b and a plurality of terminal devices 3a to 3d of a user. A VLAN tag including a VID is assigned to the packet 80. The VID is an example of an identifier used to identify a network. The identifier is not limited to the VID. However, in a case where the VID is used as in this example, a standard VLAN tag specified by Institute of Electrical and Electronics Engineers (IEEE) 802.1Q can be used.

The gateway devices 2a and 2b transfer packets between the E-TREE 9 and the Internet (not illustrated) or another network. The terminal devices 3a to 3d are, for example, tablet terminals, personal computers, or smartphones, or the like and access the Internet (not illustrated) or the other network via the E-TREE 9. Note that the terminal devices 3a to 3d may be directly connected to the E-TREE 9 or may be connected to the E-TREE 9 via a Local Area Network (LAN).

The E-TREE 9 includes a plurality of layer 2 switches (L2SW) 1 that is an example of a communication device. As an example, the E-TREE 9 includes nodes A to H, and the layer 2 switch 1 is provided in each of the nodes A to H. The node A is adjacent to the gateway device 2a and the nodes B and E, and the node C is adjacent to the nodes B and D and the terminal device 3a. The node D is adjacent to the node C and the terminal device 3b.

Furthermore, the node E is adjacent to the gateway device 2b and the nodes A and F, and the node G is adjacent to the nodes F and H and the terminal device 3c. The node H is adjacent to the node G and the terminal device 3d.

In each layer 2 switch 1, a plurality of ports P that transmits/receives the packets 80 with the adjacent devices is provided. An interface attribute of a path between each port P and the adjacent device is set to each port P.

An interface attribute between the layer 2 switch 1 and the gateway devices 2a and 2b is "root", and an interface attribute between the layer 2 switch 1 and the terminal devices 3a to 3d is "leaf". Furthermore, an interface attribute between the layer 2 switches 1 is "NNI". Note that the root attribute path is an example of a first path connected to the port P, the leaf attribute path is an example of a second path connected to the port P, and the NNI attribute port path is an example of a third path connected to the port P.

In the E-TREE 9, communication between users is prohibited while connection from a user to the Internet is allowed. Therefore, although communication from the root to the other root or the leaf such as communication in paths R1, R2, and R5 and communication from the leaf to the root are prohibited, communication between the leaves such as communication in paths R3 and R4 is prohibited. Therefore, the layer 2 switch needs to transfer packets through an asymmetric path.

The layer 2 switch 1 updates or maintains a VID of a packet according to respective interface attributes of an ingress (hereinafter, referred to as "IG") side port P (hereinafter, referred to as "reception port") that receives the packet 80 and an egress (hereinafter, referred to as "EG") side port P (hereinafter, referred to as "transmission port") that transmits the packet 80. As a result, the layer 2 switch 1 detects a packet 80 from a leaf to another leaf on the basis of the VID and discards the detected packet 80.

(Configuration Example of Layer 2 Switch)

Figure 2:
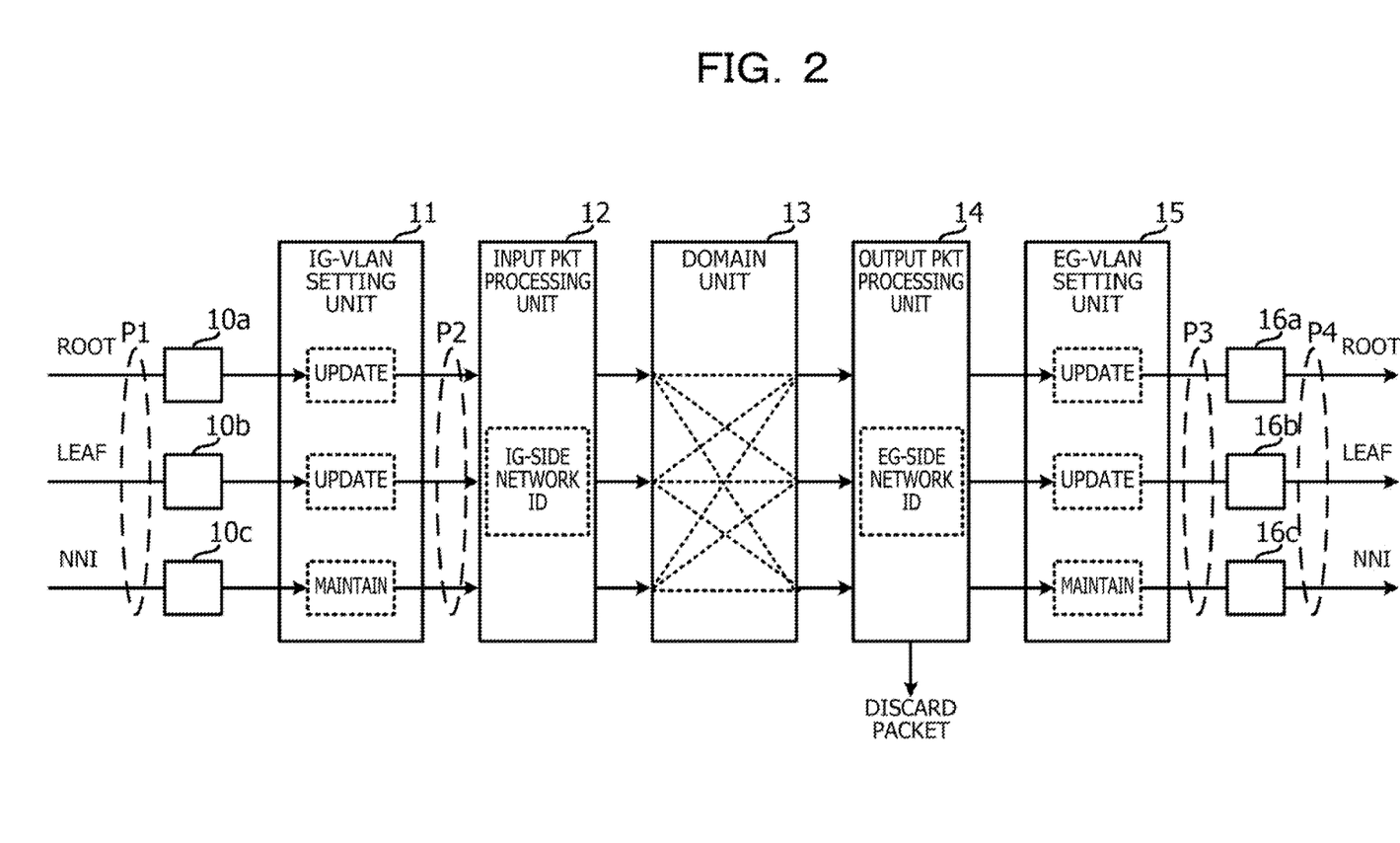
FIG. 2 is a configuration diagram illustrating an example of a layer 2 switch.

FIG. 2 is a configuration diagram illustrating an example of the layer 2 switch 1. The layer 2 switch 1 includes reception ports 10a to 10c, an IG-VLAN setting unit 11, an input packet (PKT) processing unit 12, a domain unit 13, an output packet (PKT) processing unit 14, an EG-VLAN setting unit 15, and transmission ports 16a to 16c. Note that an operation of the layer 2 switch 1 to be described below is an example of a communication method.

The reception ports 10a to 10c and the transmission ports 16a to 16c are connected to paths of an adjacent device. Each of a set of the reception ports 10a to 10c and a set of the transmission ports 16a to 16c configures a single port P. Interface attributes of the reception port 10a and the transmission port 16a are root, interface attributes of the reception port 10b and the transmission port 16b are leaf, and interface attributes of the reception port 10c and the transmission port 16c are NNI.

The NNI attribute reception port 10c and transmission port 16c are set so as to transmit and receive packets having two types of VIDs ("30" and "40") to be described later. As a result, the layer 2 switch 1 can transmit and receive the packets having the two types of VIDs with the NNI attribute paths. Note that the interface attributes and the numbers of the reception ports 10a to 10c and the transmission ports 16a to 16c change according to the adjacent device of the layer 2 switch 1 in the E-TREE 9.

The reception port 10a receives packets from the adjacent gateway devices 2a and 2b and outputs the received packet to the IG-VLAN setting unit 11. The reception port 10b receives packets from the adjacent terminal devices 3a to 3d and outputs the received packet to the IG-VLAN setting unit 11. The reception port 10c receives packets from the adjacent layer 2 switch 1 and outputs the received packet to the IG-VLAN setting unit 11.

The IG-VLAN setting unit 11 is an example of an input-side update unit, and updates and maintains a VID assigned to the packet. The IG-VLAN setting unit 11 updates a VID of the packet input from the root attribute reception port 10a and a VID of the packet input from the leaf attribute reception port 10b respectively to individual values according to the root attribute path and the leaf attribute path. Furthermore, the IG-VLAN setting unit 11 maintains a VID of the packet input from the NNI attribute reception port 10c without updating the VID. The IG-VLAN setting unit 11 outputs the packet of which the VID is updated or maintained to the input packet processing unit 12. Note that the IG-VLAN setting unit 11 is set so as to receive packets of the two types of VIDs ("30" and "40") to be described later.

The input packet processing unit 12 assigns an in-device header to the packet, and inserts an IG-side network ID according to the interface attributes of the reception ports 10a to 10c into the in-device header. The input packet processing unit 12 outputs the packet to which the in-device header is added to the domain unit 13.

The domain unit 13 floods the packet of which the VID is updated or maintained by the IG-VLAN setting unit 11 to a port P other than the reception ports 10a to 10c of the packets. As a result, the domain unit 13 learns correspondence relationships between a Destination Address (DA) that is a destination address of a packet and the transmission ports 16a to 16c, and determines a transmission port among the transmission ports 16*a* to 16*c* based on the correspondence relationship. The domain unit 13 outputs the packets of which the transmission ports 16*a* to 16*c* are determined to the output packet processing unit 14. Note that the domain unit 13 is an example of a determination processing unit that determines the transmission ports 16*a* to 16*c* of the packets.

After detecting the IG-side network ID of the in-device header, the output packet processing unit 14 deletes the in-device header from the packet. Furthermore, the output packet processing unit 14 detects an EG-side network ID based on the interface attributes of the transmission ports 16*a* to 16*c* determined by the domain unit 13.

The output packet processing unit 14 discards the packet according to a combination of the IG-side network ID and the EG-side network ID. As a result, the output packet processing unit 14 prohibits communication between the leaves. Note that the output packet processing unit 14 is an example of a discarding processing unit that discards packets. The output packet processing unit 14 outputs packets other than the packet to be discarded to the EG-VLAN setting unit 15.

The EG-VLAN setting unit 15 is an example of an output-side update unit and updates or maintains a VID assigned to the packet of which each of the transmission ports 16*a* to 16*c* are determined by the domain unit 13. The EG-VLAN setting unit 15 respectively updates the VID of the packet transmitted from the root attribute transmission port 16*a* and the VID of the packet transmitted from the leaf attribute transmission port 16*b* to respective values according to the root attribute path and the leaf attribute path. Furthermore, the EG-VLAN setting unit 15 maintains the VID of the packet transmitted from the NNI attribute transmission port 16*c* without updating the VID. The EG-VLAN setting unit 15 outputs the packets of which the VIDs are updated or maintained to the transmission ports 16*a* to 16*c*.

The root attribute transmission port 16*a* transmits the packets to the gateway devices 2*a* and 2*b*. The leaf attribute transmission port 16*b* transmits the packets to the terminal devices 3*a* to 3*d*. The NNI attribute transmission port 16*c* transmits the packet to the other layer 2 switch 1 in the E-TREE 9.

Note that the reception ports 10*a* to 10*c*, the IG-VLAN setting unit 11, the input packet processing unit 12, the domain unit 13, the output packet processing unit 14, the EG-VLAN setting unit 15, and the transmission ports 16*a* to 16*c* are circuits including hardware such as an Application Specific Standard Product (ASSP). Here, in a case where the layer 2 switch 1 performs optical communication, each of the reception ports 10*a* to 10*c* and the transmission ports 16*a* to 16*c* includes a Laser Diode (LD) and a Photo Diode (PD).

Furthermore, each of the IG-VLAN setting unit 11, the input packet processing unit 12, the domain unit 13, the output packet processing unit 14, and the EG-VLAN setting unit 15 may be a unit in which a program that drives a processor such as a Central Processing Unit (CPU) and hardware such as an ASSP operate in cooperation with each other.

(Function of Domain Unit)

Figure 3:
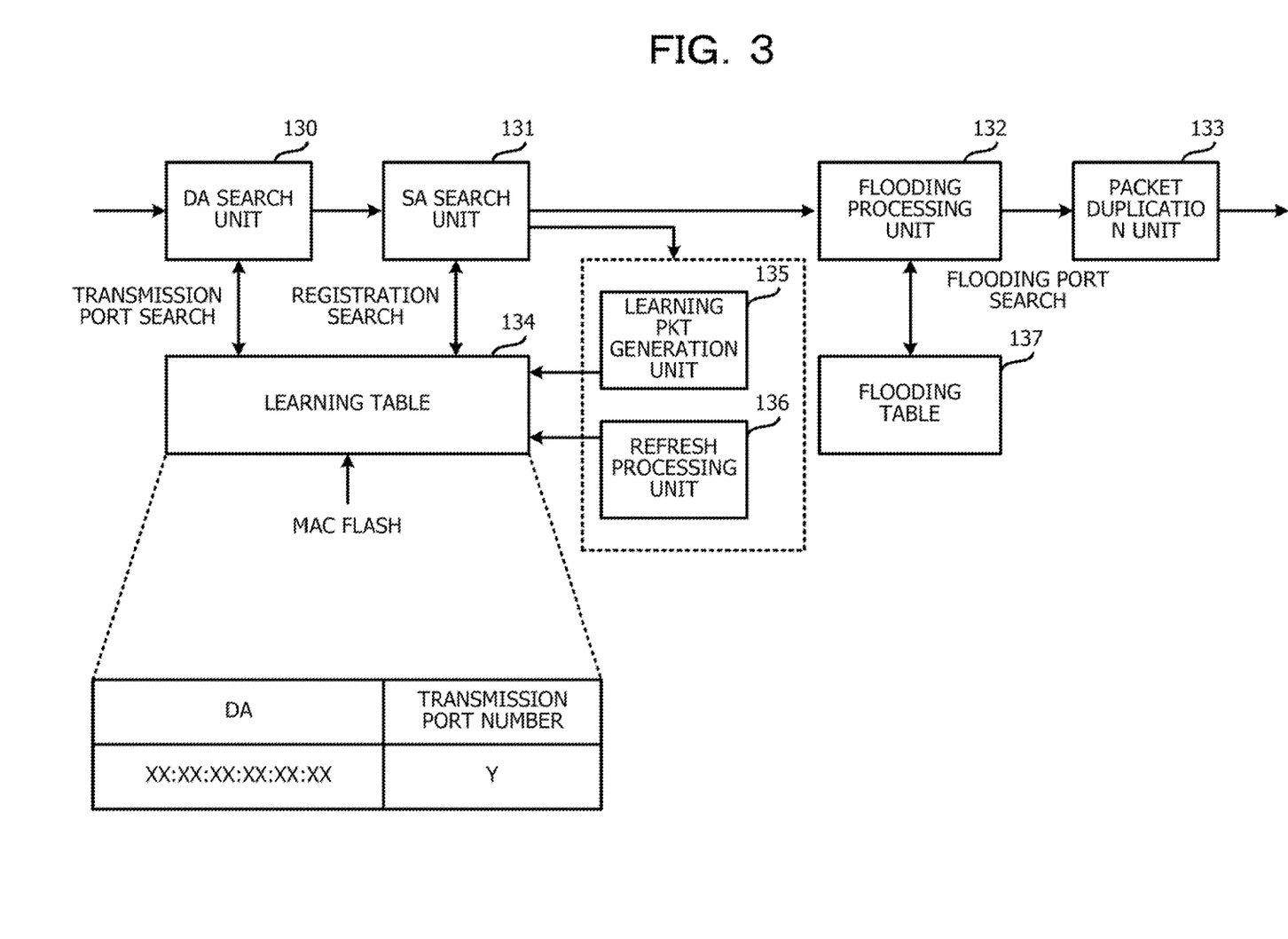
FIG. 3 is a configuration diagram illustrating an example of a domain unit.

FIG. 3 is a configuration diagram illustrating an example of the domain unit 13. The domain unit 13 includes a DA search unit 130, an SA search unit 131, a flooding processing unit 132, a packet duplication unit 133, a learning table 134, a learning packet (PKT) generation unit 135, a refresh processing unit 136, a flooding table 137. All the ports P of the layer 2 switch 1 are connected to the domain unit 13.

A packet is input from the input packet processing unit 12 to the DA search unit 130. The DA search unit 130 searches the learning table 134 for one of the transmission ports 16*a* to 16*c* corresponding to a DA of the packet.

The learning table 134 is stored, for example, in a storage circuit such as a memory. In the learning table 134, a correspondence relationship between a DA (XX:XX:XX:XX:XX:XX (X: any hexadecimal number)) and a transmission port number (Y: any positive integer) is registered. Here, the transmission port number is an identification number of each of the transmission ports 16*a* to 16*c*. The learning table 134 is cleared according to a MAC flash instruction from an external control circuit (not illustrated).

Furthermore, the packet is input from the DA search unit 130 to the SA search unit 131. The SA search unit 131 searches the learning table 134 for a DA that matches a Source Address (SA) that is a transmission source address of the packet.

When the DA matched the SA has been registered in the learning table 134, the SA search unit 131 instructs the refresh processing unit 136 to execute refresh processing. The refresh processing unit 136 resets an aging timer for registering the searched DA and the transmission port number. When the aging timer expires, it is determined that the registered DA and transmission port number are unused, and the registrations are deleted.

Furthermore, when the DA matched the SA is not registered in the learning table 134 yet, the SA search unit 131 instructs the learning packet generation unit 135 to generate a learning packet. The learning packet generation unit 135 generates learning packets respectively having pieces of information regarding the transmission port numbers according to the reception ports 10*a* to 10*c* of the packets and sets the generated packets to the learning table 134 so that the DA and the transmission port number are registered in the learning table 134.

The packet is input from the SA search unit 131 to the flooding processing unit 132. In a case where the DA of the packet is not registered in the learning table 134 yet, the flooding processing unit 132 searches the flooding table 137 for a port P to be flooded and floods the packet to the port P. The port P to be flooded is a port P other than the reception ports 10*a* to 10*c* that are reception sources of the packet.

The flooding table 137 is stored, for example, in a storage circuit such as a memory. In the flooding table 137, the transmission port numbers of the transmission ports 16*a* to 16*c* to be flooded corresponding to the SA and the VID of the packet are registered.

The packet is input from the flooding processing unit 132 to the packet duplication unit 133. When the packet is flooded, the packet duplication unit 133 duplicates packets as many as the ports to be flooded, the packet duplication unit 133 outputs the packets to the port P, and when the packet is not flooded, the packet duplication unit 133 transfers the packet to the transmission ports 16*a* to 16*c* indicated by the transmission port number searched by the DA search unit 130 from the learning table 134.

Figure 4:
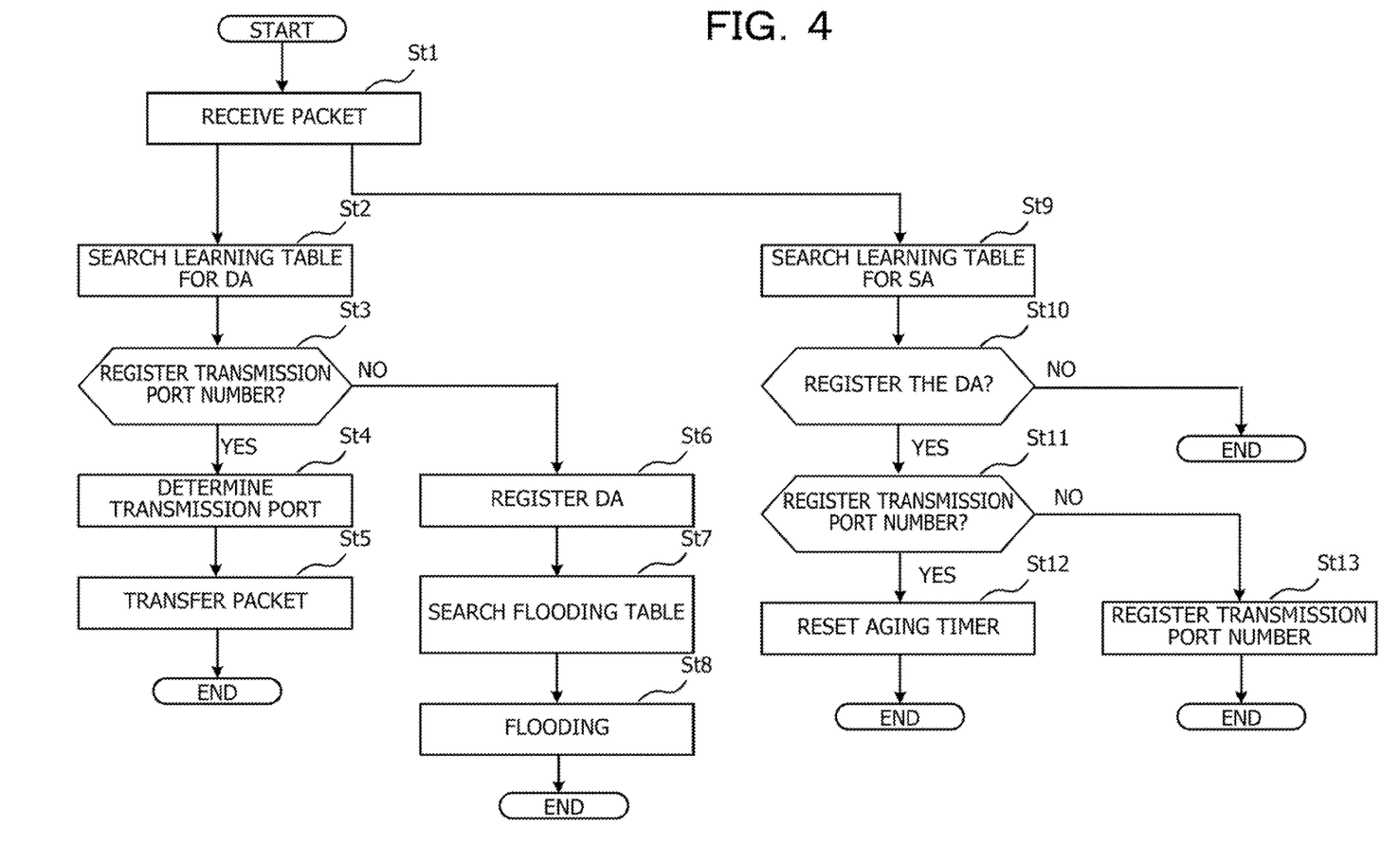
FIG. 4 is a flowchart illustrating an example of processing at the time when the domain unit receives a packet.

FIG. 4 is a flowchart illustrating an example of processing at the time when the domain unit 13 receives a packet. When the domain unit 13 receives a packet (step St1), each processing in steps St2 to St8 and each processing in steps St9 to St12 are simultaneously executed in parallel. The processing in each of steps St2 to St8 will be described first, and then, the processing in each of steps St9 to St12 will be described.

The DA search unit 130 searches the learning table 134 for a transmission port number corresponding to a DA of the packet (step St2). When the transmission port number has been registered in the learning table 134 (Yes in step St3), the DA search unit 130 determines transmission ports 16a to 16c indicated by the transmission port number corresponding to the DA in the learning table 134 as a transfer destination of the packet (step St4). Next, the packet duplication unit 133 transfers the packets to the determined transmission ports 16a to 16c (step St5). As a result, the packets are respectively transmitted from the transmission ports 16a to 16c according to a destination.

Furthermore, When the transmission port number is not registered in the learning table 134 yet (No in step St3), the DA search unit 130 registers only the DA of the packet in the learning table 134 (step St6). Next, the flooding processing unit 132 searches the flooding table 137 for the transmission ports 16a to 16c to be flooded according to the SA and the VID of the packet (step St7). Next, the packet duplication unit 133 duplicates the packets and transfers the packets to the transmission ports 16a to 16c to be flooded (step St8).

Furthermore, the SA search unit 131 searches the learning table 134 for a DA that matches the SA (step St10). In a case where the DA (the DA) that matches the SA is not registered in the learning table 134 yet (No in step St10), the processing ends.

When the DA (the DA) that matches the SA has been registered in the learning table 134 (Yes in step St10), it is determined whether or not a transmission port number corresponding to the DA is registered in the learning table 134 (step St11). When the transmission port number has been registered (Yes in step St11), the refresh processing unit 136 resets the DA and an aging timer of the transmission port number to zero (step St12).

Furthermore, When the transmission port number is not registered yet (No in step St11), the learning packet generation unit 135 generates a learning packet and outputs the generated packet to the learning table 134 so as to register the transmission port number in the learning table 134 (step St13). The learning packet includes transmission port numbers indicating the transmission ports 16a to 16c respectively corresponding to the reception ports 10a to 10c that have received the packets. As a result, the DA and the transmission port number are registered in the learning table 134 in association with each other.

In this way, the domain unit 13 floods the packet of which the VID is updated or maintained by the IG-VLAN setting unit 11 to the port P other than the port P that is a reception source. As a result, the domain unit 13 learns a correspondence relationship between the DA of the packet and the transmission ports 16a to 16c and determines the transmission ports 16a to 16c on based on the correspondence relationship.

Therefore, the domain unit 13 transfers the packet received by the leaf attribute port P to the other leaf attribute port P. Therefore, the IG-VLAN setting unit 11 and the EG-VLAN setting unit 15 discard a packet for communication between the leaf attributes by the output packet processing unit 14 by appropriately updating or maintaining the VID of the packet according to the interface attributes of the reception ports 10a to 10c and the transmission ports 16a to 16c.

(VID Setting Example)

Figure 5:
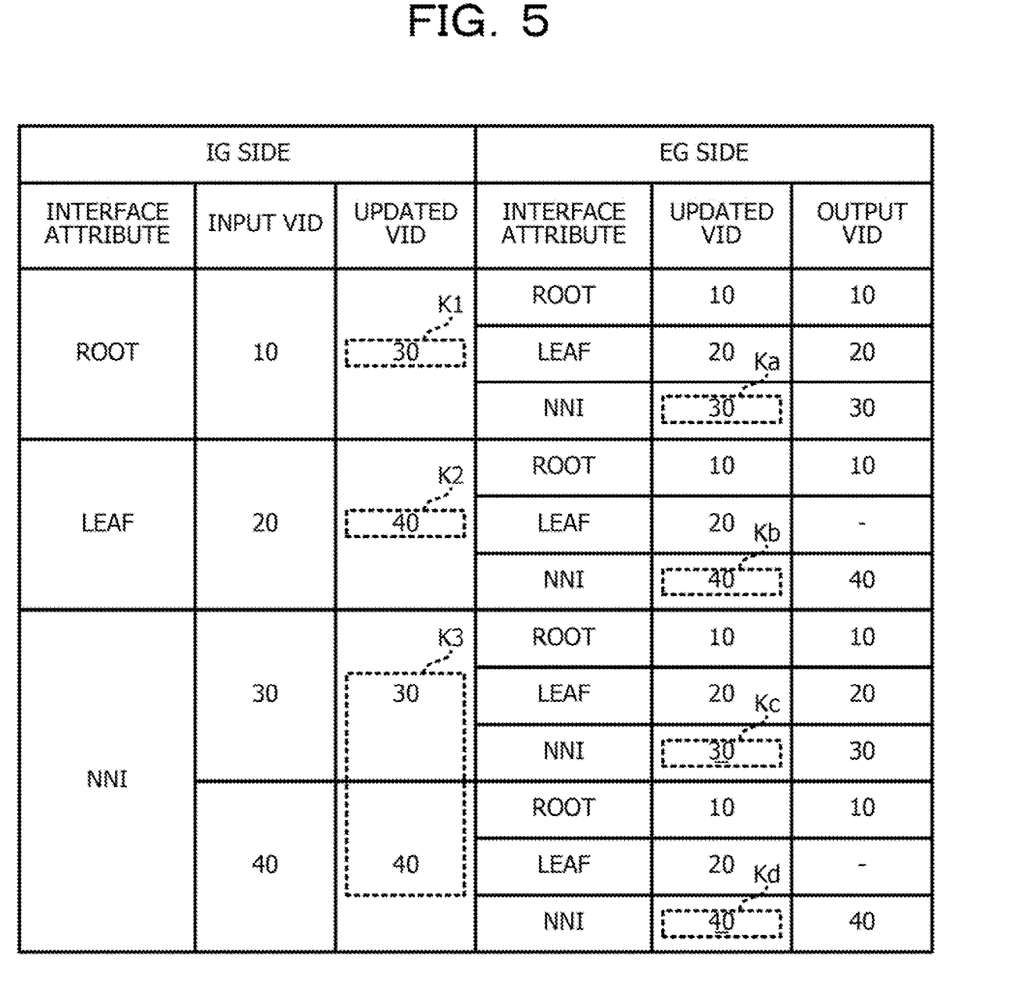
FIG. 5 is a diagram illustrating a setting example of a VID.

FIG. 5 is a diagram illustrating a setting example of a VID. FIG. 5 illustrates a correspondence relationship between an interface attribute, an input VID, and an updated VID on the IG side and an interface attribute, an updated VID, and an output VID on the EG side.

The IG-side interface attribute is preset to the port P (reception ports 10a to 10c) on the packet reception side. The IG-side input VID is a VID of a packet input to the IG-VLAN setting unit 11 as indicated by a reference numeral P1 in FIG. 2. The IG-side updated VID is a VID of a packet output from the IG-VLAN setting unit 11 as indicated by a reference numeral P2 in FIG. 2.

The EG-side input VID is a VID of a packet output from the EG-VLAN setting unit 15 as indicated by a reference numeral P3 in FIG. 2. The EG-side updated VID is a VID of a packet output from the EG-VLAN setting unit 15 as indicated by a reference numeral P4 in FIG. 2. Note that, in this example, it is assumed that the VID of the packet of the root attribute path be "10" and the VID of the packet of the leaf attribute path be "20". The VID "10" is an example of a value according to the first path, and the VID "20" is an example of the second path.

The IG-VLAN setting unit 11 updates the VID of the packet received by the root attribute port P from "10" (input VID) to "30" (updated VID)(refer to reference numeral K1), and updates the VID of the packet received by the leaf attribute port P from "20" to "40" (refer to reference numeral K2).

As a result, the IG-VLAN setting unit 11 can set the different VIDs "30" and "40" to the packets according to whether the reception-side port P has the root attribute and the leaf attribute. Note that the IG-VLAN setting unit 11 is an example of an input-side update unit, the VID "30" is an example of a first value, and the VID "40" is an example of a second value.

Furthermore, the IG-VLAN setting unit 11 maintains the VID "30" or "40" of the packet received by the NNI attribute port P without updating the VID (refer to reference numeral K3). Therefore, the input VID is the same as the updated VID.

When the transmission-side port P determined by the domain unit 13 has the root attribute, the EG-VLAN setting unit 15 updates the VID from "30" or "40" (IG-side updated VID) to "10" that is a value according to the leaf attribute (EG-side updated VID). Furthermore, in a case where the transmission-side port P determined by the domain unit 13 has the leaf attribute, the EG-VLAN setting unit 15 updates the VID from "30" or "40" to "20" that is a value according to the leaf attribute.

Here, because the packet of which the IG-side updated VID is "40" and the EG-side updated VID is "20" is a packet for communication between the leaf attribute paths, the packet is discarded. The output VID of the packet that is not discarded is the same as the EG-side updated VID.

Furthermore, when the transmission-side port P determined by the domain unit 13 has the NNI attribute, the EG-VLAN setting unit 15 maintains the VID to be "30" or "40" without updating the VID (refer to reference numerals Ka to Kd). Therefore, to the respective paths between the layer 2 switches in the E-TREE 9, packets having the VIDs "30" or "40" which is different with each other are transmitted.

Therefore, each layer 2 switch 1 can detect whether the path that is a transmission source of the packet has the root attribute or the leaf attribute from the VID. Therefore, the output packet processing unit 14 can identify a packet to be discarded from the VID of the packet output from the IG-VLAN setting unit 11, that is, for example, the IG-side updated VID.

(Packet Discarding Processing)

Figure 6:
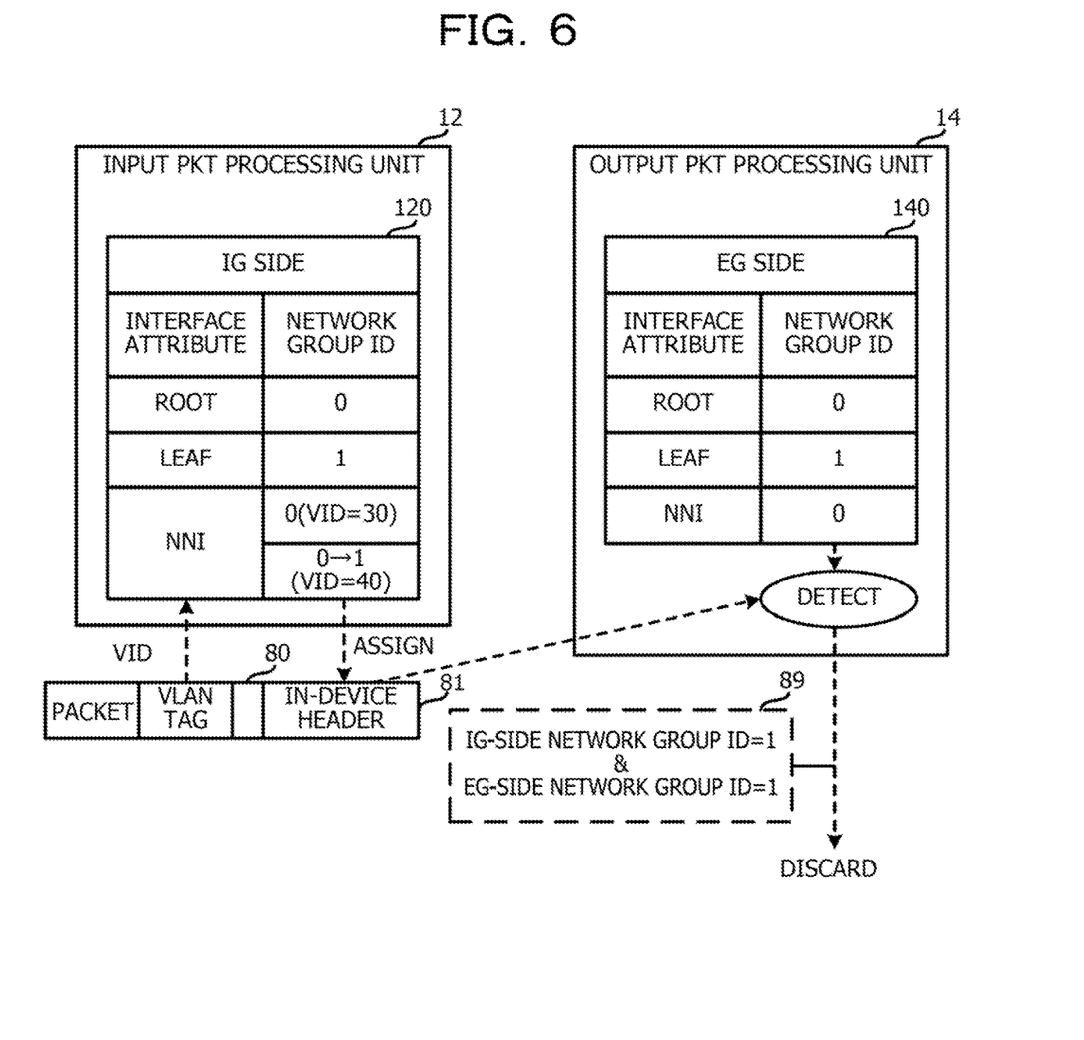
FIG. 6 is a diagram illustrating an example of packet discarding processing.

FIG. 6 is a diagram illustrating an example of packet discarding processing. In the input packet processing unit 12, as indicated by a reference numeral 120, an IG-side network group ID according to the interface attribute is set for each of the reception ports 10a to 10c that is a connection destination. In a case of the root attribute port P, the network group ID is set to zero, in a case of the leaf attribute port P, the network group ID is set to one, and in a case of the NNI attribute port P, the network group ID is set to zero.

Here, in a case of the NNI attribute port P, the network group ID is updated according to a VID in the WAN tag of the packet 80. The input packet processing unit 12 acquires the VID updated or maintained by the IG-VLAN setting unit 11 from the packet 80, and in a case where the VID is a value "40" indicating that the leaf attribute path is a transmission source, the input packet processing unit 12 updates the network group ID from zero to one.

The input packet processing unit 12 assigns an in-device header 81 including the IG-side network group ID and various pieces of control information to the packet 80. After being input to the domain unit 13, the packet 80 is output from the domain unit 13 to the output packet processing unit 14. Note that the IG-side network group ID=1 is an example of a discarding ID, and the input packet processing unit 12 is an example of an assigning unit.

In the output packet processing unit 14, as indicated by a reference numeral 140, an EG-side network group ID according to the interface attribute is set for each of the transmission ports 16a to 16c that is a connection destination. In a case of the root attribute port P, the network group ID is set to zero, in a case of the leaf attribute port P, the network group ID is set to one, and in a case of the NNI attribute port P, the network group ID is set to zero.

The output packet processing unit 14 detects the IG-side network group ID from the in-device header 81 assigned to the packet 80 input from the domain unit 13. Furthermore, the output packet processing unit 14 detects the EG-side network group ID according to the transmission ports 16a to 16c of the packet 80.

In a case where the IG-side network group ID detected from the in-device header 81 is one and the network group ID of the transmission ports 16a to 16c of the packet 80 is one (refer to reference numeral 89), the output packet processing unit 14 discards the packet. That is, for example, the packet 80 is discarded that is received by the leaf attribute reception port 10b or the NNI attribute reception port 10c having the leaf attribute path as a transmission source and transmitted from the leaf attribute transmission port 16b. Note that the output packet processing unit 14 deletes the in-device header 81 from the packet 80.

In this way, the output packet processing unit 14 discards the packet 80 of which the VID is updated to "40" or is maintained by the IG-VLAN setting unit 11 and of which the transmission ports 16a to 16c determined by the domain unit 13 are connected to the leaf attribute path. As a result, because it is not possible to perform communication between the leaf attribute paths, the communication between the terminal devices 3a and 3b via the E-TREE 9 is prohibited.

Furthermore, the output packet processing unit 14 discards the packet 80 of which the IG-side network group ID is detected as one. Therefore, the output packet processing unit 14 can easily detect the packet 80 to be discarded.

(Communication Example of E-TREE)

Figure 7:
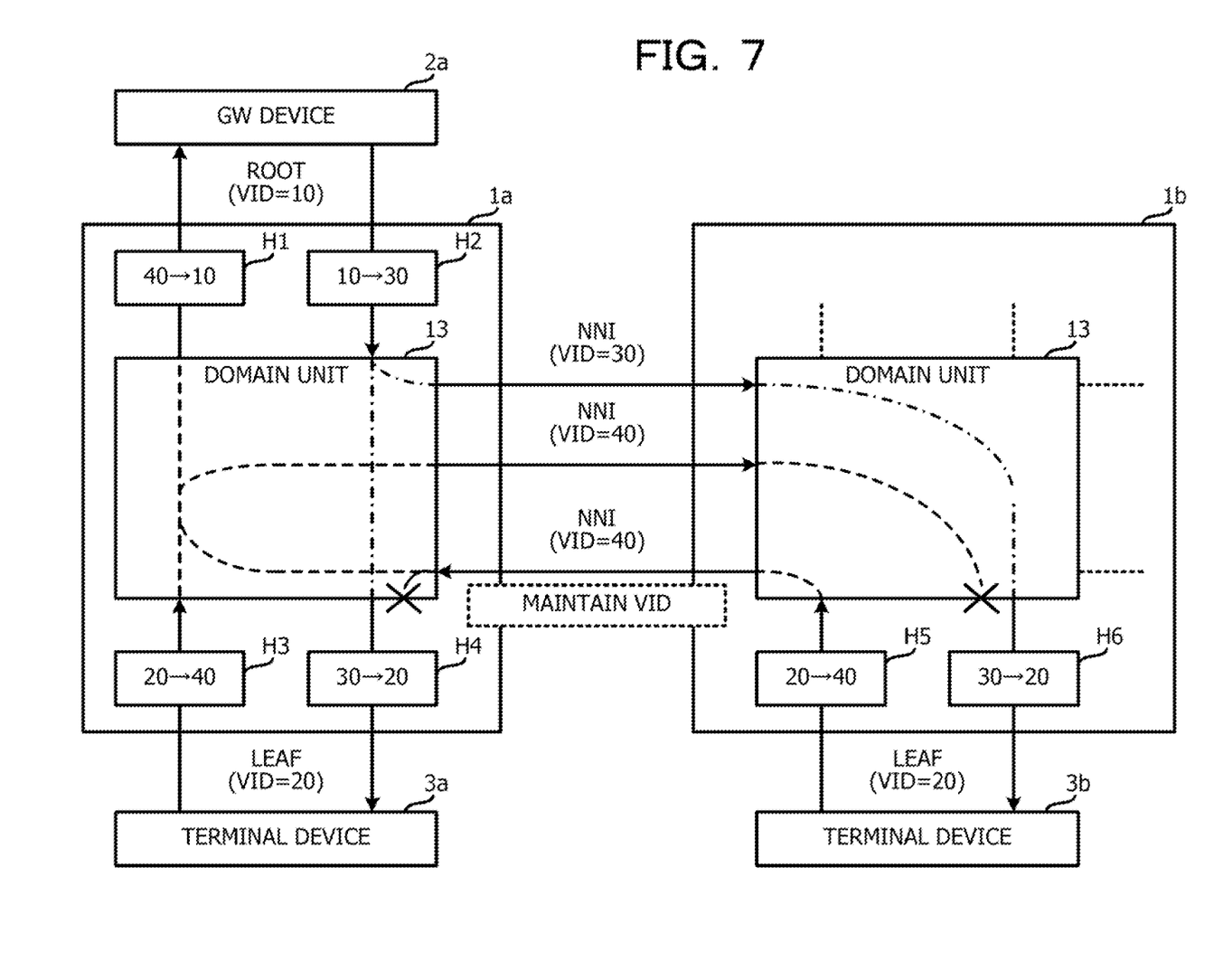
FIG. 7 is a diagram illustrating a communication example of the E-TREE.

FIG. 7 is a diagram illustrating a communication example of the E-TREE 9. The E-TREE 9 includes layer 2 switches 1a and 1b adjacent to each other.

Although the layer 2 switches 1a and 1b have the same functional configurations as the layer 2 switch 1 described above, configurations other than the domain unit 13 are not illustrated. The layer 2 switch 1a is adjacent to the gateway device 2a via a root attribute path, is adjacent to the terminal device 3a via a leaf attribute path, and is adjacent to the other layer 2 switch 1b via an NNI attribute path.

The layer 2 switch 1b is adjacent to the terminal device 3b via a leaf attribute path and is adjacent to the other layer 2 switch 1a via an NNI attribute path. Furthermore, reference numerals H1, H4, and H6 indicate values before and after the update of the VID by the EG-VLAN setting unit 15, and reference numerals H2, H3, and H5 indicate values before and after the update of the VID by the IG-VLAN setting unit 11.

The domain unit 13 executes packet transfer processing in any communication direction between the gateway device 2a and the terminal devices 3a and 3b. Regarding the packet in a communication direction from the gateway device 2a to the terminal devices 3a and 3b, a VID is updated from "10" to "30" before the packet is input to the domain unit 13 of the layer 2 switch 1a (refer to reference numeral H2). Regarding the packet toward the terminal device 3a, a VID is updated from "30" to "20" after being output from the domain unit 13 (refer to reference numeral H4), and the packet is transmitted to the terminal device 3a via the leaf attribute path.

Furthermore, regarding the packet toward the terminal device 3b, a VID is maintained to be "30" after being output from the domain unit 13, and the packet is transmitted to the other layer 2 switch 1b via the NNI attribute path. The packet in the layer 2 switch 1b is input to the domain unit 13 with the VID that is maintained to be "30". Regarding the packet toward the terminal device 3b, a VID is updated from "30" to "20" after being output from the domain unit 13 (refer to reference numeral H6), and the packet is transmitted to the terminal device 3b via the leaf attribute path.

Regarding the packet in a communication direction from the terminal device 3a to the gateway device 2a, a VID is updated from "20" to "40" before the packet is input to the domain unit 13 of the layer 2 switch 1a (refer to reference numeral H3). Next, the VID of the packet is updated from "40" to "10" after being output from the domain unit 13 (refer to reference numeral H1), the packet is transmitted to the gateway device 2a via the root attribute path.

Furthermore, regarding a packet in a communication direction from the terminal device 3b to the gateway device 2a, a VID is updated from "20" to "40" before the packet is input to the domain unit 13 of the layer 2 switch 1b (refer to reference numeral H5). Next, the packet, of which the VID is maintained to be "40" after being output from the domain unit 13, is transmitted to the other layer 2 switch 1a via the root attribute path. Next, the VID of the packet is updated from "40" to "10" after being output from the domain unit 13 of the layer 2 switch 1a (refer to reference numeral H1), the packet is transmitted to the gateway device 2a via the root attribute path.

Furthermore, regarding a packet in a communication direction from the terminal device 3a to the other terminal device 3b, a VID is updated from "20" to "40" before the packet is input to the domain unit 13 of the layer 2 switch 1a (refer to reference numeral H3). Next, the packet, of which the VID is maintained to be "40" after being output from the domain unit 13, is transmitted to the other layer 2 switch 1b via the root attribute path.

Because the VID of the packet in the layer 2 switch 1b is "40", the input packet processing unit 12 assigns an in-device header including an IG-side network group ID=1. The packet with the VID that is maintained to be "40" is input to the domain unit 13. Because the packet output from the domain unit 13 to the leaf attribute port P has the IG-side network group ID of one, the packet is discarded by the output packet processing unit 14 (refer to x mark).

Furthermore, regarding a packet in a communication direction from the terminal device 3b to the other terminal device 3a, a VID is updated from "20" to "40" before the packet is input to the domain unit 13 of the layer 2 switch 1b (refer to reference numeral H5). Next, the packet, of which the VID is maintained to be "40" after being output from the domain unit 13, is transmitted to the other layer 2 switch 1a via the root attribute path.

Because the VID of the packet in the layer 2 switch 1a is "40", the input packet processing unit 12 assigns an in-device header including an IG-side network group ID=1. The packet with the VID that is maintained to be "40" is input to the domain unit 13. Because the packet output from the domain unit 13 to the leaf attribute port P has the IG-side network group ID of one, the packet is discarded by the output packet processing unit 14 (refer to x mark).

As described above, in a case where the port P is connected to the root attribute path or the leaf attribute path, the IG-VLAN setting unit 11 updates the VID assigned to the packet received by each port P to each of values of "10", "20", "30", and "40" according to the root attribute path and the leaf attribute path, respectively. Furthermore, in a case where the port P is connected to the NNI attribute path of the other layer 2 switch 1 in the E-TREE 9, the IG-VLAN setting unit 11 maintains the VID.

Therefore, the layer 2 switch 1 can assign a VID that differs according to whether the path of the transmission source is the root attribute path or the leaf attribute path to the packet before the packet is input to the domain unit 13 and input the packet to the domain unit 13 without updating the assigned VID.

Furthermore, in a case where the port P that transmits the packet is connected to the root attribute path or the leaf attribute path, the EG-VLAN setting unit 15 updates the VID assigned to the packet output from the domain unit 13 from "30" or "40" to "10" or "20" that is a value according to the root attribute path or the leaf attribute path. In a case where the port P that transmits the packet is connected to the NNI attribute path, the EG-VLAN setting unit 15 maintains the VID assigned to the packet output from the domain unit 13.

Therefore, the layer 2 switch 1 can update each packet output from the domain unit 13 to the value "10" or "20" that is the value according to the root attribute path or the leaf attribute path to be a destination of the packet. Furthermore, the layer 2 switch 1 can relay the packet to the other layer 2 switch 1 in the E-TREE 9 without updating the VID assigned to the packet output from the domain unit 13.

Therefore, the layer 2 switch 1 can identify the path of the transmission source of the packet according to the VIDs "30" and "40" and can transmit and receive the packets having the VIDs of "30" and "40" via the NNI attribute path. Therefore, the layer 2 switch 1 can control transfer of packets for each flow on the basis of the VID regardless of the communication direction.

Furthermore, the output packet processing unit 14 discards the packet 80 of which the VID is updated to "40" or is maintained by the IG-VLAN setting unit 11 and of which the transmission ports 16a to 16c determined by the domain unit 13 are connected to the leaf attribute path.

As a result, the layer 2 switch 1 can discard the packet of which a transmission source path and a destination path have the leaf attributes. Therefore, communication between the terminal devices 3a and 3b of the user is prohibited.

Therefore, unlike the following comparative example, the layer 2 switch 1 can transfer packets by the single domain unit 13 regardless of the packet communication direction and can perform MAC address learning of an asymmetric path in which the communication between the users is prohibited.

Comparative Example

Figure 8:
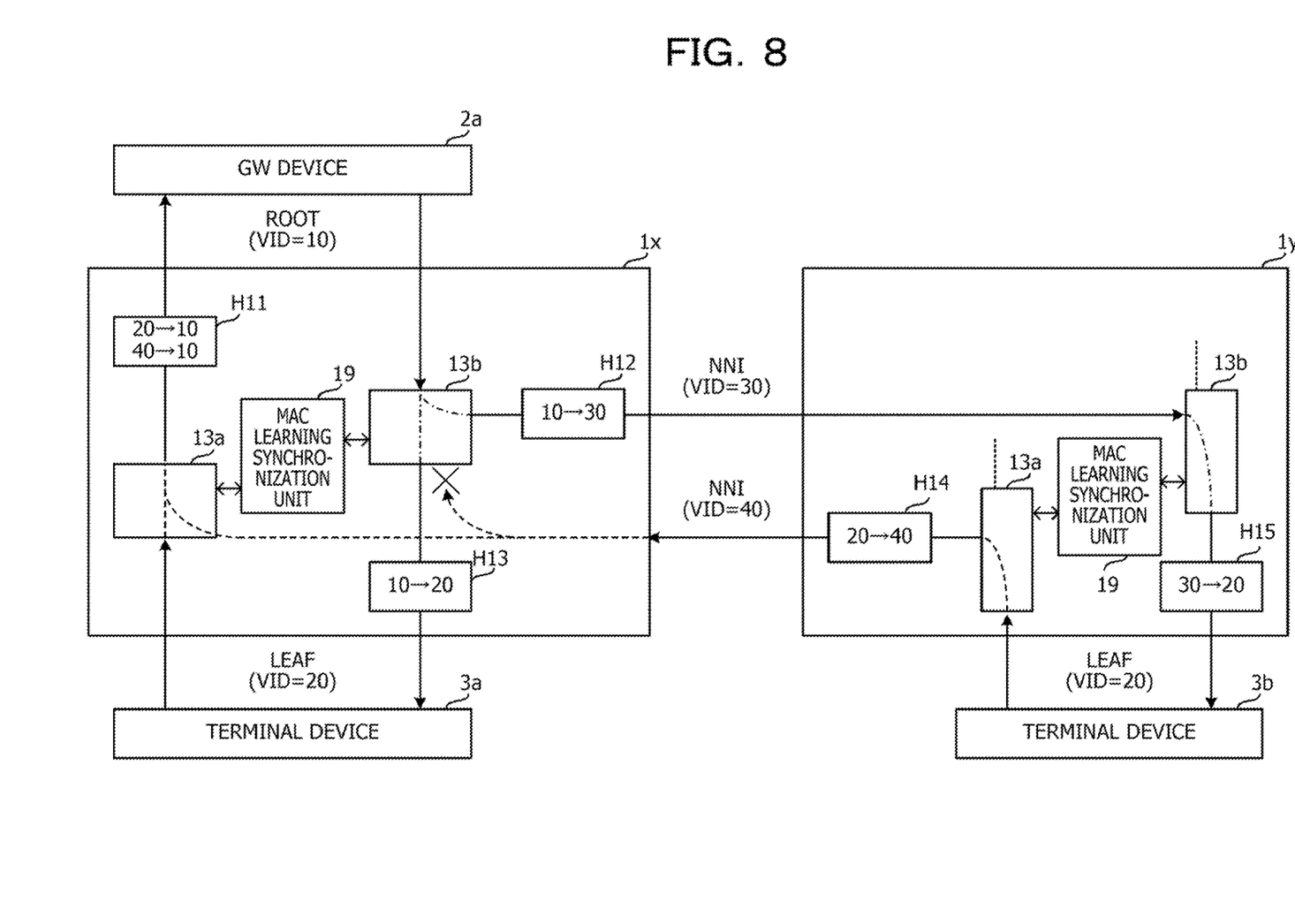
FIG. 8 is a configuration diagram illustrating an E-TREE of a comparative example.

FIG. 8 is a configuration diagram illustrating an E-TREE according to a comparative example. An E-TREE 9 includes layer 2 switches 1x and 1y as an example.

In each of the layer 2 switches 1x and 1y according to the comparative example, functions of flooding and MAC address learning are divided into two domain units 13a and 13b to achieve MAC address learning of an asymmetric path. One domain unit 13b performs flooding and MAC address learning on a packet through a path from a gateway device 2a to terminal devices 3a and 3b, and another domain unit 13a performs flooding and MAC address learning on a packet through a path from the terminal devices 3a and 3b to the gateway device 2a.

A MAC learning synchronization unit 19 is provided between the two domain units 13a and 13b. The MAC learning synchronization unit 19 synchronizes MAC address learning between the two domain units 13a and 13b. For example, the MAC learning synchronization unit 19 executes the MAC address learning synchronization processing from one of the domain units 13a and 13b to the other domain unit by transferring a packet for MAC address learning of which VLAN tag information is edited to an opposite direction.

In this way, the layer 2 switch can prohibit communication between leaves by separating the domain units 13a and 13b for each communication direction (refer to x mark).

Furthermore, reference numerals H11 to H15 indicate values of VIDs before and after update. Although the layer 2 switches 1x and 1y according to the comparative example update VIDs assigned to packets output from the domain units 13a and 13b, the layer 2 switches 1x and 1y maintain VIDs assigned to packets input to the domain units 13a and 13b without updating the VIDs.

For example, a value "20" according to a leaf attribute path is assigned to a packet transmitted from the terminal device 3a to the gateway device 2a. Although the packet is input to the domain unit 13a of the layer 2 switch 1x with a VID to be maintained to "20", the VID is updated to a value "10" according to a root attribute path after the packet is output from the domain unit 13a (refer to reference numeral H11).

Furthermore, the value "20" according to the leaf attribute path is assigned to a packet transmitted from the terminal device 3b to the gateway device 2a. Although the packet is input to the domain unit 13a of the layer 2 switch 1y with a VID to be maintained to "20", the VID is updated to a value "40" according to an NNI attribute path after the packet is output from the domain unit 13a (refer to reference numeral H14).

Next, although the packet is input to the domain unit 13a of the layer 2 switch 1x with a VID to be maintained to "40", the VID is updated to a value "10" according to the root attribute path after the packet is output from the domain unit 13a (refer to reference numeral H11).

Furthermore, the value "10" according to the root attribute path is assigned to a packet transmitted from the gateway device 2a to the terminal device 3a. Although the packet is input to the domain unit 13b of the layer 2 switch 1x with a VID to be maintained to "10", the VID is updated to the value "20" according to the leaf attribute path after the packet is output from the domain unit 13b (refer to reference numeral H13).

Furthermore, the value "10" according to the root attribute path is assigned to a packet transmitted from the gateway device 2a to the terminal device 3b. Although the packet is input to the domain unit 13b of the layer 2 switch 1x with a VID to be maintained to "10", the VID is updated to the value "30" according to the NNI attribute path after the packet is output from the domain unit 13b (refer to reference numeral H12).

Next, although the packet is input to the domain unit 13b of the layer 2 switch 1y with a VID to be maintained to "30", the VID is updated to the value "20" according to the leaf attribute path after the packet is output from the domain unit 13b (refer to reference numeral H15).

In this way, after the transmission destination paths are determined by the domain units 13a and 13b for each packet communication direction, the layer 2 switches 1x and 1y according to the comparative example update the VIDs to the values according to the paths. Therefore, it is not possible for the layer 2 switches 1x and 1y transmit and receive packets having two types of VIDs ("30" and "40") via the common NNI attribute path.

On the other hand, the layer 2 switch 1 according to the embodiment updates the VIDs of the packets received from the root attribute path and the leaf attribute path to the individual values "30" or "40" for the respective paths before the transmission-side port P is determined by the domain unit 13. Therefore, the layer 2 switch 1 can transmit and receive the packets having the two types of VIDs ("30" and "40") via the common NNI attribute path, and determine whether or not to discard the packet according to the value of the VID.

Furthermore, because the domain unit 13 of the layer 2 switch 1 executes the packet transfer processing regardless of the packet communication direction, the domain unit 13 of the layer 2 switch 1 can reduce hardware than a case where the domain units 13a and 13b for the respective communication directions are provided as in the layer 2 switches 1x and 1y according to the comparative example. As a result, for example, the number of paths used in the layer 2 switch 1 is about half of those of the layer 2 switches 1x and 1y according to the comparative example. Therefore, it is possible to provide a service of the E-TREE 9 to more users.

The embodiment described above is a preferred example. However, the embodiments are not limited to this, and a variety of modifications may be made without departing from the scope of the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A first communication device of relaying a packet in a relay network including at least a gateway device, a second communication device, and a plurality of terminal devices, the first communication device comprising:
    a plurality of ports configured to transmit and receive the packet, each of the plurality of ports being a port that is set as any one of a first port, a second port, or a third port, the first port being a port connected to the gateway device via the relay network, the second port being a port connected to any of the plurality of terminal devices via the relay network, the third port being a port connected to the second communication device via the relay network; and
    a processor configured to perform processing, the processing including:
        obtaining a first packet being a packet received via any one of the plurality of ports;
        in response to the obtaining of the first packet, performing first updating processing on the first packet to obtain a second packet being the first packet processed by the first updating processing, the first updating processing including
            in a case where the first packet has been received via a port set as the first port among the plurality of port, updating a virtual local area network identifier (VID) of the first packet to a first value being a value that corresponds to the first port to obtain the second packet that has the updated VID of the first packet as the VID of the second packet,
            in a case where the first packet has been received via a port set as the second port among the plurality of port, updating the VID of the first packet to a second value being a value that corresponds to the second port to obtain the second packet that has the updated VID of the first packet as the VID of the second packet, and
            in a case where the first packet has been received via a port set as the third port among the plurality of port, obtaining the second packet that has the VID of the first packet as the VID of the second packet without updating the VID of the first packet;
        in response to the performing of the first updating processing, performing determination processing including
            in a case where a destination address of the second packet is not included in a correspondence relationship information, updating the correspondence relationship information on a correspondence relationship between the destination address of the second packet and a transmission port being a port to be used to transmit the second packet, by flooding the second packet to, among the plurality of ports, ports other than the any one of the plurality of ports, and
            in a case where the destination address of the second packet is included in the correspondence relationship information, determining, based on the correspondence relationship information, the transmission port
            to be used to transmit the second packet from among the plurality of ports;
        in response to the performing of the determination processing, performing second updating processing on the second packet to obtain a third packet being the second packet processed by the second updating processing, the second updating processing including in a case where the determined transmission port is the port that is set as the first port, updating the VID of the second packet to a value corresponding to a path between the first communication apparatus and the gateway device to obtain the third packet that has the updated VID of the second packet as the VID of the third packet, in a case where the determined transmission port is the port that is set as the second port, when the VID of the second packet is not the second value, updating the VID of the second packet to a value corresponding to a path between the first communication apparatus and a terminal device among the plurality of terminal devices to obtain the third packet that has the updated VID of the second packet as the VID of the third packet, in a case where the determined transmission port is the port that is set as the second port, when the VID of the second packet is the second value, obtaining the third packet that has the VID of the second packet as the VID of the third packet without updating the VID of the second packet, and in a case where the determined transmission port is the port that is set as the third port, obtaining the third packet that has the VID of the second packet as the VID of the third packet without updating the VID of the second packet; and in repose to the performing of the second updating processing, performing transmission processing on the third packet, the transmission processing including in a case where the determined transmission port is not a port that is set as the second port, transmitting the third packet from the determined transmission port, in a case where the determined transmission port is a port that is set as the second port, when the VID of the third packet is not the second value, transmitting the third packet from the determined transmission port, and in a case where the determined transmission port is a port that is set as the second port, when the VID of the third packet is the second value, discarding the third packet before the transmitting of the third packet.

2. The communication device according to claim 1, wherein:

the first updating processing includes, in a case where the first packet has been received via a port set as the third port among the plurality of port, incorporating a discarding Identifier (ID) into the obtained second packet, the transmission processing includes discarding the third packet obtained from the second packet having discarding ID.

3. A communication method implemented by a first communication device of relaying a packet in a relay network including at least a gateway device, a second communication device, and a plurality of terminal devices, the communication method comprising:

obtaining a first packet being a packet received via any one of a plurality of ports included in the first communication device, each of the plurality of ports being a port that is set as any one of a first port, a second port, or a third port, the first port being a port connected to the gateway device via the relay network, the second port being a port connected to any of the plurality of terminal devices via the relay network, the third port being a port connected to the second communication device via the relay network;

in response to the obtaining of the first packet, performing first updating processing on the first packet to obtain a second packet being the first packet processed by the first updating processing, the first updating processing including in a case where the first packet has been received via a port set as the first port among the plurality of port, updating a virtual local area network identifier (VID) of the first packet to a first value being a value that corresponds to the first port to obtain the second packet that has the updated VID of the first packet as the VID of the second packet, in a case where the first packet has been received via a port set as the second port among the plurality of port, updating the VID of the first packet to a second value being a value that corresponds to the second port to obtain the second packet that has the updated VID of the first packet as the VID of the second packet, and in a case where the first packet has been received via a port set as the third port among the plurality of port, obtaining the second packet that has the VID of the first packet as the VID of the second packet without updating the VID of the first packet;

in response to the performing of the first updating processing, performing determination processing including in a case where a destination address of the second packet is not included in a correspondence relationship information, updating the correspondence relationship information on a correspondence relationship between the destination address of the second packet and a transmission port being a port to be used to transmit the second packet, by flooding the second packet to, among the plurality of ports, ports other than the any one of the plurality of ports, and in a case where the destination address of the second packet is included in the correspondence relationship information, determining, based on the correspondence relationship information, the transmission port to be used to transmit the second packet from among the plurality of ports;

in response to the performing of the determination processing, performing second updating processing on the second packet to obtain a third packet being the second packet processed by the second updating processing, the second updating processing including in a case where the determined transmission port is the port that is set as the first port, updating the VID of the second packet to a value corresponding to a path between the first communication apparatus and the gateway device to obtain the third packet that has the updated VID of the second packet as the VID of the third packet, in a case where the determined transmission port is the port that is set as the second port, when the VID of the second packet is not the second value, updating the VID of the second packet to a value corresponding to a path between the first communication apparatus and a terminal device among the plurality of terminal devices to obtain the third packet that has the updated VID of the second packet as the VID of the third packet, in a case where the determined transmission port is the port that is set as the second port, when the VID of the second packet is the second value, obtaining the third packet that has the VID of the second packet as the VID of the third packet without updating the VID of the second packet, and in a case where the determined transmission port is the port that is set as the third port, obtaining the third packet that has the VID of the second packet as the VID of the third packet without updating the VID of the second packet; and in repose to the performing of the second updating processing, performing transmission processing on the third packet, the transmission processing including in a case where the determined transmission port is not a port that is set as the second port, transmitting the third packet from the determined transmission port, in a case where the determined transmission port is a port that is set as the second port, when the VID of the third packet is not the second value, transmitting the third packet from the determined transmission port, and in a case where the determined transmission port is a port that is set as the second port, when the VID of the third packet is the second value, discarding the third packet before the transmitting of the third packet.

4. The communication method according to claim 3, wherein the first updating processing includes, in a case where the first packet has been received via a port set as the third port among the plurality of port, incorporating the transmission processing includes discarding the third packet obtained from the second packet having discarding ID.

\* \* \* \* \*